(12) United States Patent
Lutz et al.

(10) Patent No.: US 8,138,851 B2
(45) Date of Patent: Mar. 20, 2012

(54) HIGH BANDWIDTH PROGRAMMABLE TRANSMISSION LINE EQUALIZER

(75) Inventors: Robert C. Lutz, Sunnyvale, CA (US); Thomas S. Wong, San Jose, CA (US); Ulrich Bruedigam, Frankfurt (DE)

(73) Assignee: Micrel, Inc., San Jose, CA (US)

( * ) Notice: Subject to any disclaimer, the term of this patent is extended or adjusted under 35 U.S.C. 154(b) by 254 days.

(21) Appl. No.: 12/725,394

(22) Filed: Mar. 16, 2010

(65) Prior Publication Data

US 2011/0227675 A1    Sep. 22, 2011

(51) Int. Cl.
*H04B 3/14* (2006.01)
(52) U.S. Cl. .................................. 333/81 R; 375/229
(58) Field of Classification Search ............... 333/28 R, 333/18; 375/229, 230, 231, 232, 234, 235
See application file for complete search history.

(56) References Cited

U.S. PATENT DOCUMENTS

| | | | |
|---|---|---|---|
| 3,689,752 A | 9/1972 | Gilbert | |
| 4,885,547 A | 12/1989 | Bell, Jr. et al. | |
| 6,111,463 A | 8/2000 | Kimura | |
| 2003/0016091 A1 * | 1/2003 | Casper | 333/18 |

OTHER PUBLICATIONS

"10.7Gbps Adaptive Receive Equalizer," Maxim MAX3805 Data Sheet, pp. 1-10, Mar. 2006.

* cited by examiner

*Primary Examiner* — Stephen Jones
(74) *Attorney, Agent, or Firm* — Patent Law Group LLP; Carmen C. Cook

(57) ABSTRACT

A transmission line equalizer includes multiple signal paths connected in parallel between an equalizer input signal and an output amplifier where each signal path has a network implementing a specific frequency dependent response and each signal path implements current gain amplification with one or more of the signal paths having a variable gain programmed through a time invariant, DC programming signal. Furthermore, one or more of the signal paths implements linear-to-nonlinear signal transformations and compensating nonlinear-to-linear signal transformations to generate linearized output signals at the one or more signal paths. The equalizer further includes the output amplifier summing output signals from the multiple signal paths to generate an equalized output signal. In operation, the gain of the one or more signal paths is varied to establish the relative proportions of the output signals generated by each signal path and summed at the output amplifier.

32 Claims, 5 Drawing Sheets

HIGH BANDWIDTH PROGRAMMABLE TRANSMISSION LINE EQUALIZER

FIELD OF THE INVENTION

The invention relates to transmission line equalizers and, in particular, to a programmable transmission line equalizer for use in high bandwidth applications.

DESCRIPTION OF THE RELATED ART

High digital data rates often mandate using properly terminated, controlled impedance paths, called transmission lines, to maintain data integrity. Transmission lines can include a variety of media, such as coaxial cables, twinax cables, as well as single traces and differential pair traces on a PC board such as striplines, microstrip lines and coplanar waveguides. Most of these media exhibit signal loss as the data signal is transmitted over the length of the transmission line and that signal loss increases with line length and signal harmonic frequencies. That is, the higher frequency components of the data signal being carried are more susceptible to signal loss for long line length. Because the high frequency components of a digital bit stream define the transition edges of the data signal, attenuation of the high frequency components of the data signal results in distortion. A transmission line equalizer is employed as an end-of-line receiver to selectively boost the higher signal harmonics or higher frequency components of the signal to compensate for frequency dependent losses, thus helping to restore the distorted signal received to the original digital data stream.

A transmission line equalizer is a circuit inserted at the end of a transmission line to compensate for the frequency response of the transmission line. More specifically, a transmission line equalizer realizes wave-reshaping of the received signal to make up for losses in the higher frequency components of the digital bit stream resulted from the transmission of the digital data on the transmission line.

A transmission line equalizer is different from an amplifier because an amplifier only boosts the amplitude of the signal while the shape of the amplifier output signal remains the same as the shape of the amplifier input signal. Equalization actually works to reshape the received signal so as to recover the shape of the original bit stream before forwarding a restored and recognizable digital signal to its point of use.

SUMMARY OF THE INVENTION

According to one embodiment of the present invention, a transmission line equalizer includes multiple signal paths connected in parallel between an equalizer input signal and an output amplifier where each signal path has a network implementing a specific frequency dependent response and each signal path implements current gain amplification with one or more of the signal paths having a variable gain programmed through a time invariant, DC programming signal. Furthermore, one or more of the signal paths implements linear-to-nonlinear signal transformations and compensating nonlinear-to-linear signal transformations to generate linearized output signals at the one or more signal paths. The equalizer further includes the output amplifier summing output signals from the multiple signal paths to generate an equalized output signal. In operation, the gain of the one or more signal paths is varied to establish the relative proportions of the output signals generated by each signal path and summed at the output amplifier.

The present invention is better understood upon consideration of the detailed description below and the accompanying drawings.

DETAILED DESCRIPTION OF THE PREFERRED EMBODIMENTS

Figure 1:
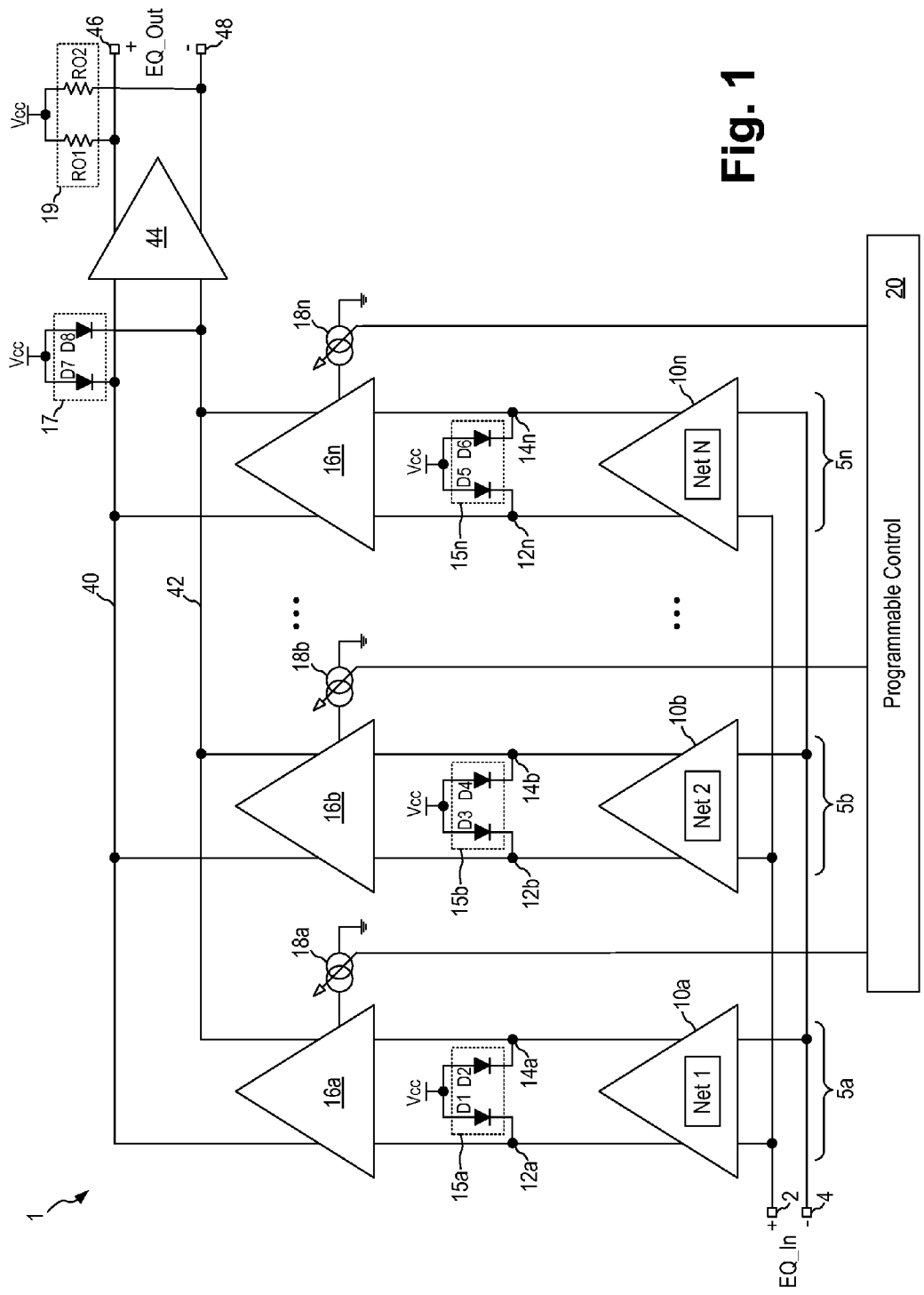
FIG. 1 is a generalized schematic diagram of a transmission line equalizer according to a first embodiment of the present invention.

In accordance with the principles of the present invention, a high speed transmission line equalizer includes multiple signal paths, each signal path incorporating a simple on-chip, integrated network implementing a specific frequency dependent response characteristic. The gain of one or more of the signal paths is programmable to enable specific frequency dependent response to be tailored for the specific transmission medium. Thus, the multiple signal paths operate in parallel wherein the amplitudes of the multiple signal paths are adjusted and summed to optimize the equalization capability, accuracy and application flexibility of the equalizer. The signal paths incorporate linear-to-nonlinear signal transformations, compensating nonlinear-to-linear signal transformations, differential signaling, and ultra-high bandwidth variable current gain amplification to achieve high frequency performance. The unique combination of elements forming the multiple signal paths of the transmission line equalizer provides simple, cost effective methods for restoring the signal integrity to degraded high-speed digital data streams on relatively long transmission lines.

The transmission line equalizer of the present invention offers a flexible, integrated solution, suitable for equalizing very high data rates in either single-ended or differential signal formats. The transmission line equalizer of the present invention provides many advantages over conventional equalizers.

First, conventional equalizers often provide limited number of predefined settings from which the users can select. Often, these predefined settings are not ideal for the user's applications. On the other hand, the transmission line equalizer of the present invention enables infinite variability in equalization characteristics, allowing better matching of the equalization to the line loss characteristics of the transmission line.

Second, some conventional equalizers use "adaptive equalization" features which employ feedback techniques to configure the equalizer to electronically adapt to the transmission line to which it is connected. As is well known in the art, adaptive equalization using a feedback loop has many disadvantages, including slow speed of response and the requirement for a specific data pattern. To the contrary, the transmission line equalizer of the present invention does not depend on a feedback loop and thus can operate with no start-up time requirement and no data pattern restrictions. The transmission line equalizer of the present invention accomplishes equalization by programming fixed proportions of two or more responses during the design or characterization of each application. Once the programming of the equalizer is established, the application operates with no restriction on start-up time or data pattern.

Third, the transmission line equalizer of the present invention uses only a very simple network in each signal path. In the present description, a simple network refers to a network that includes one or two or a few components only. Thus, the transmission line equalizer of the present invention can realize equalization without using complex circuitry typically used in the conventional techniques.

Fourth, an equalizer is often deployed without prior knowledge of the type or characteristics of the media being used as the transmission line. Because signal losses vary widely with transmission line construction, materials, length and data rate, a conventional equalizer often cannot accommodate a wide range of applications employing different types and lengths of transmission line. However, the transmission line equalizer of the present invention incorporates programmable control and is capable of adjusting the gain boosting characteristics as desired to accommodate different signal loss characteristics of the transmission medium. The transmission line equalizer of the present invention permits a single equalizer to be used to address a broader range of applications.

As embodied in some embodiments of the present invention, adjustability or programmability of the equalization is achieved via analog or digital programming techniques and requires only a DC interface to the equalizer integrated circuit (or "equalizer chip") during operation. Programmability is thus realized without off-chip routing of high speed signals, further assuring data integrity. More specifically, in one embodiment, one or more time invariant, DC programming signals are used to program the variable gains of the individual signal paths. In one embodiment, DC currents, that are set via common programming techniques, determine individual gains for the signal paths in the equalizer. The programmability of the equalization in the equalizer of the present invention allows a single equalizer design to serve a wide range of applications. Furthermore, the transmission line equalizer of the present invention can be integrated with transceiver circuitry into single-chip equalization solutions and, by employing any of the several programming technologies, the one chip design can be used to address a wide range of equalization applications.

Third, unlike active equalization, the transmission line equalizer of the present invention requires no control loop, no start-up period, no restrictions on received data patterns, and adds no loop related jitter to the output signal. Fourth, alternative embodiments of the present invention offer improved tolerance to component mismatch to minimize undesirable DC offset in the signal output.

Finally, as thus constructed, the transmission line equalizer of the present invention improves the equalization of the digital bit stream being transmitted down a transmission line. When equalization is improved, the transmission line length between two terminal points can be increased to eliminate the need for a repeater. In other words, when equalization is improved, the cable length is increased so that the transmission line distance between two terminal points is increased before a repeater is needed to restore bit stream data integrity. Eliminating or reducing the deployment of repeaters reduces system cost.

In sum, the transmission line equalizer of the present invention provides adjustability as well as the ability to use simple network circuitry to operate at high speed. The transmission line equalizer can be constructed in a single integrated circuit while providing flexibility to equalize a wide variety of transmission lines of varying length. The transmission line equalizer of the present invention represents a marked improvement over conventional high speed transmission line equalizers.

In one embodiment, the transmission line equalizer of the present invention is applied in a single-chip transceiver that provides bidirectional communication on a pair of transmission lines. The transceiver receives incoming signals from one transmission line and drives outgoing signals on a second transmission line. The transmission line equalizer is implemented at the receiving end of the transceiver to equalize the incoming digital bit stream.

The Gilbert Gain Cell and Multiplier

Embodiments of the transmission line equalizer of the present invention incorporate the Gilbert gain cell and multiplier which is described in U.S. Pat. No. 3,689,752, to Barrie Gilbert. Characteristics of the Gilbert gain cell include differential amplifier techniques wherein linear-to-nonlinear and compensating nonlinear-to-linear signal transformations and current amplification are employed to minimize signal voltage amplitude and preserve high bandwidth. Due to inherent input to output capacitances, most transistors, including bipolar transistors, exhibit higher frequency capability in current amplification modes where the output terminal (collector) voltage is not allowed to move very much. Hence, Gilbert gain cell circuitry provides superior high frequency response capability for the present application.

A salient feature of the Gilbert gain cell is that the Gilbert amplifiers generally have the capability of responding as fast or faster than any other circuit elements built using the same semiconductor technology. Incorporation of the Gilbert gain cell concepts within the present invention assures adequate equalizer performance can be realized for all data rates that might be driven using the same semiconductor technology. This is an important advantage for transceiver applications, where both data stream driver and receiver coexist on the same chip. Lastly, these advantages apply within most common semiconductor technologies including MOS, CMOS, etc., and are not limited to bipolar technologies.

Another feature of the Gilbert gain cell is the use of nonlinear loading. Bipolar and MOS transistors are not linear devices. Specifically, device transconductance ("voltage in to current out") characteristics are nonlinear. For bipolar transistors, the base-to-emitter input voltage and collector output current dynamics are exponentially related. For MOS transistors, the gate-source input voltage to drain output current characteristic is basically a square law relationship. In a Gilbert gain cell, to linearize the output of the transistors, a nonlinear load having the opposite or inverse nonlinear characteristics is coupled to the input of the amplifier to cancel out the inherent nonlinearity of the transistors. For example, when the output current at the amplifier is proportional to the exponential of the input voltage, then a load formed of diodes wherein the voltage across the load varies logarithmically with the current applied to this load. The logarithmic relationship at the input nodes cancels out the exponential characteristic at the output nodes and a linear current amplifier is obtained. As thus constructed, linear current gain amplification can be realized. By using a nonlinear load that has the inverse I-V characteristics of the transistor transconductance characteristic, linear current amplification is achieved.

Lastly, a Gilbert cell has the inherent ability to output a signal that is the mathematical product of two input signals. In some embodiments of the present invention, the received input signal is multiplied by the value of programmed DC currents in one or more of the parallel signal paths, thereby creating an output signal magnitude that scales in magnitude to value of that DC current. By this mechanism, relative magnitudes of the path specific signals are adjusted before being summed by the output stage.

First Embodiment

FIG. 1 is a schematic diagram of a transmission line equalizer according to a first embodiment of the present invention. Referring to FIG. 1, a transmission line equalizer 1 receives differential equalizer input signal EQ_In to be equalized on differential input terminals 2, 4 and generates differential equalized output signal EQ_Out on differential output terminals 46, 48. Transmission line equalizer 1 ("equalizer 1") includes multiple parallel signal paths 5a to 5n, each signal path incorporating a unique network (Net 1 to Net N) to implement specific frequency dependent response for the signal path to allow equalizer 1 to be used to equalize a wide range of applications.

The equalizer input signal EQ_In is coupled to the inputs of each of the parallel signal paths 5a-5n. In the present embodiment, the signal paths 5a to 5n are constructed in the same manner, except that each signal path has its own unique network Net 1 to Net N. Each signal path 5a-5n includes a first stage amplifier 10a-10n, an interstage loading network 15a-15n, and a second stage amplifier 16a-16n. The output currents from all of the signal paths 5a to 5n are summed and then coupled to a third stage amplifier 44. The following detail description refers to the first signal path 5a but it is understood that the description applies to the other signal paths 5b to 5n.

Signal path 5a includes a first stage amplifier 10a. First stage amplifier 10a is implemented as a special transconductance amplifier which receives differential input voltages and generates differential output currents. A unique network Net 1 is embedded in the first stage amplifier 10a to determine the frequency or transient response characteristic of the signal path 5a, wherein the differential output currents generally reflect the current through Net 1 in response to the differential input voltage applied across Net 1. Similarly, unique networks Net 2 to Net N are embedded in the first stage amplifiers 10b-10n to determine the frequency or transient response characteristic of those respective signal paths.

In the present description, the network response refers to the frequency or transient response characteristics of the network Net 1 to Net N which are designed to provide various frequency dependent responses to the input signal. Such responses can include a simple broadband response (also referred to as a "linear transform") where all input frequencies of interest are amplified equally, a frequency band response where certain frequency ranges are amplified more than others, or a time derivative response where amplification generally increases with frequency of the input signal. Moreover, in the present embodiment, individual responses including broadband, high pass, and time derivative can all be generated with simple one or two component networks. More importantly, the individual frequency dependent responses of the networks overlap and cumulate for higher frequencies so that the summed output signal from all the signal paths has a magnitude that continuously increases with increasing frequency. Incorporating simple networks with frequency dependent responses that overlap and cumulate realizes an improved compensation scheme for transmission line equalizers as transmission line response magnitude typically continuously decreases with increasing signal frequency and/or increasing transmission line length. As will be discussed below, by variably scaling and summing these various responses, degraded digital data stream can be easily recovered. The transmission line equalizer of the present invention is thus capable of achieving high performance transmission line equalization for a broad range of applications without complex circuitry.

First stage amplifier 10a generates differential output currents on output nodes 12a, 14a, reflecting the application of the equalizer input voltage signal EQ_In to the unique network Net 1. The output currents, including inherent DC bias currents, flow through interstage loading network 15a. Interstage loading network 15a transforms the output currents into voltages at the same nodes that serve as the input signals to the next amplifier stage. More specifically, interstage loading network 15a is a nonlinear loading network applied to work cooperatively with the input circuit of the second stage amplifier 16a to generate a linearized second stage output current for the signal path. In the present embodiment, interstage loading network 15a is implemented as a pair of diodes D1, D2 connected between the output nodes 12a, 14a and a DC voltage. In the present embodiment, diodes D1 and D2 are connected to the positive power supply Vcc but in other embodiments, other DC voltage values can be used. More specifically, the anode terminals of diodes D1 and D2 are connected to the Vcc voltage while the cathode terminals of diodes D1, D2 are connected to output nodes 12a, 14a, respectively. Bias currents flowing through diodes D1 and D2 forward bias these diodes. As a result, load impedances, output voltage swings, and stage voltage gains are all small, resulting in very high bandwidth at the first stage amplifier 10a.

The interstage loading network 15a, implemented using diodes D1 and D2, has a voltage output characteristic that is logarithmically proportional to the first stage differential output currents. The differential output currents on nodes 12a and 14a from the first stage amplifier 10a flow almost exclusively through the interstage loading network 15a and are converted by interstage loading network 15a into a logarithmically proportional differential output voltages that drive the second stage amplifier 16a. Second stage amplifier 16a is implemented as a transconductance amplifier which receives an input voltage and generates an output current. In the present embodiment, the second stage amplifier is assumed to be formed using a bipolar transistor differential pair as the input circuit. For small differential input voltage signals, the bipolar transistor differential pair produces differential output currents proportional to the exponential of the differential input voltage. Thus, when the first stage output voltages on nodes 12a, 14a, having logarithmic characteristics, are coupled to the bipolar transistor differential pair of the second stage amplifier 16a, having exponential characteristics, the nonlinear logarithmic and exponential characteristics cancel each other, resulting in second stage differential output currents that are linearly proportional to the first stage differential output currents.

In the present embodiment, the interstage loading network realizes a logarithmic function while the second stage amplifier realizes an exponential function. The two nonlinear characteristics cancel each other out to generate a linearized second stage output current. In other embodiments, the interstage loading network is implemented using other nonlinear functions where the specific nonlinear function is selected to compensate the nonlinear characteristic of the input circuit to the second amplifier stage. That is, the interstage loading network is selected to have inverse characteristics to that of the input circuit of the second stage amplifier.

The compensating nonlinear characteristics of the interstage loading networks maintain high bandwidth of operation for the equalizer at low power.

In transmission line equalizer 1, the second stage differential output currents of signal paths 5a to 5n are coupled to a pair of current summing nodes 40, 42, thus summing the output currents of all N-signal paths. The sum of the second stage output currents drives an interstage loading network 17. In the present embodiment, interstage loading network 17 is formed by diodes D7 and D8 connected between the nodes 40, 42 and a DC voltage. In the present embodiment, the DC voltage is the positive power supply Vcc but in other embodiments, other DC voltage values can be used. More specifically, the anode terminals of diodes D7 and D8 are connected to the Vcc voltage while the cathode terminals of diodes D7 and D8 are connected to nodes 40, 42, respectively. Similar to interstage loading network 15a described above, the nonlinear forward biased I-V characteristics of the interstage loads 17 is used to cancel out the nonlinear I-V characteristics of the input differential pair of the third stage amplifier 44, which is assumed to be a bipolar input differential pair in the present embodiment. Third stage amplifier 44 generates third stage output currents that are linearly proportional to the sum of the second stage differential output currents. Small swings are again preserved on the second and third stage output currents to ensure high bandwidth of operation. The third stage output currents are converted to the equalized output voltage EQ_Out on nodes 46, 48 by output loading stage 19. Output loading stage 19 is formed by resistor RO1 connected between a DC voltage (such as the positive power supply voltage Vcc) and output node 46 and resistor RO2 connected between a DC voltage (such as the positive power supply voltage Vcc) and the output node 48.

Transmission line equalizer 1 realizes programmability of the equalization by implementing programmable current gain at the second stage amplifiers 16a to 16n. More specifically, each second stage amplifier 16a-16n receives a programmable bias current from a respective current source 18a-n. Current sources 18a to 18n are controlled by a programmable control block 20 to set the desired magnitude of the bias current applied to each signal path 5a-n, thereby adjusting the gain for each signal path. In operation, the small signal current gain of the second stage amplifier is proportional to the magnitude of the bias current applied to the input differential pair of the second stage amplifier in each signal path. Hence, varying values of the DC bias current provided by current sources 18a-n vary the gain of the signal paths and thereby also scaling or varying the relative proportions of the specific signals generated by each signal path 5a-5n that are summed at current summing nodes 40, 42. Equalization performance is improved by programmably scaling the relative magnitudes of responses from each signal path individually to obtain the desired equalization.

In the above-described embodiment, the transmission line equalizer 1 is configured with variable gain in all of the signal paths 5a-5n. In other embodiments, transmission line equalizer 1 can be configured with at least one path having a fixed gain. Typically, the signal path with the linear transform is implemented using a fixed gain stage with the variable gain of the other signal paths being adjusted relative to the fixed gain path.

In the above-described embodiment, the transmission line equalizer 1 is configured for differential signaling. In other embodiments, transmission line equalizer 1 can be configured for single-ended signals by connecting the single ended signal to one equalizer input (2 or 4) and an appropriately biased AC ground to the other equalizer input.

Second Embodiment

Figure 2:
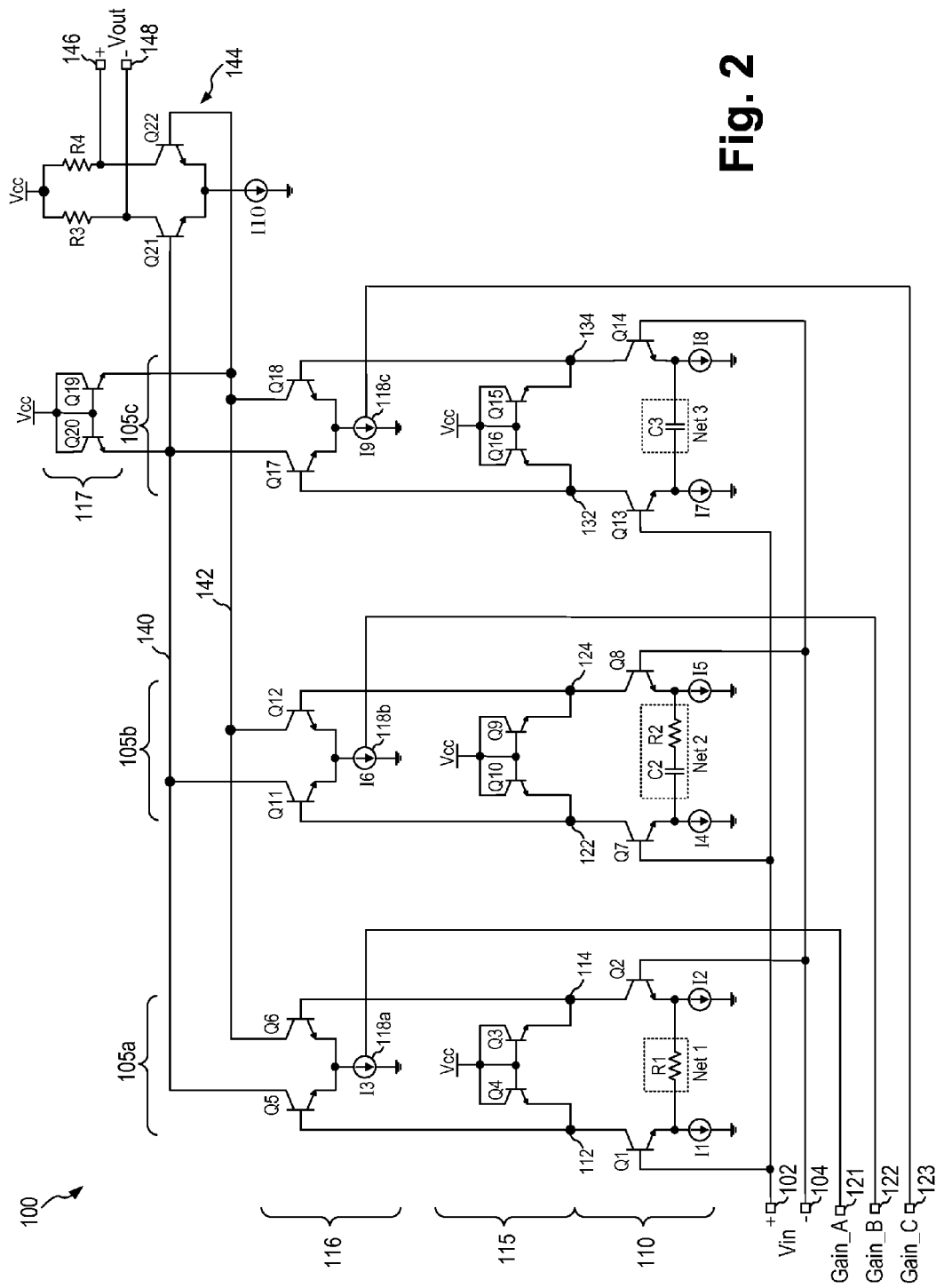
FIG. 2 is a transistor level circuit diagram of a transmission line equalizer according to a second embodiment of the present invention.

FIG. 2 is a transistor level circuit diagram of a transmission line equalizer according to a second embodiment of the present invention. FIG. 2 illustrates one embodiment of a transistor level implementation of the transmission line equalizer of FIG. 1. FIG. 2 is illustrative only and is not intended to be limiting. Other transistor level implementations of the transmission line equalizer of FIG. 1 are possible in other embodiments of the present invention.

Referring to FIG. 2, a transmission line equalizer 100 of the present embodiment is constructed using bipolar transistor technology. More specifically, the first stage amplifiers 110 in all the signal paths 105a-105c are constructed as bipolar transistor differential amplifiers with the unique networks Net 1, Net 2 and Net 3 inserted at the emitter terminals. The interstage loading networks 115 and 117 are constructed using diode-connected bipolar transistors with collector-base terminals shorted. The second stage amplifiers 116 in all the signal paths 105a-105c and the third stage amplifier 44 are constructed using bipolar transistor differential amplifiers.

In the present embodiment, transmission line equalizer 100 includes three signal paths 105a, 105b and 105c. Each signal path is constructed in the same manner except for the unique networks incorporated at the first stage amplifier 110. The following description refers to signal path 105a but it is understood that the description applies to the other signal paths 105b and 105c. The first stage amplifier 110 of signal path 105a is formed using an NPN bipolar transistor Q1 receiving one phase of the equalizer differential input signal Vin (node 102) and biased by a bias current I1 and an NPN bipolar transistor Q2 receiving the other phase of the equalizer differential input signal Vin (node 104) and biased by a bias current I2, where current sources I1 and I2 have essentially equal values. The collector terminals of transistors Q1 and Q2 form the output nodes of the first stage amplifier 110 and provide first stage differential output currents.

Diode-connected transistors Q3 and Q4 form the interstage loading network 115 to convert the first stage output currents into first stage output voltages to be inputted to second stage amplifier 116. Second stage amplifier 116 is formed by NPN bipolar transistors Q5 and Q6 having common emitters and biased by a programmable bias current I3. The second stage differential output currents are provided to current summing nodes 140, 142 to be summed with second stage differential output currents of all of the other signal paths 105b and 105c. Diode-connected transistors Q19 and Q20 form the interstage loading network 117 to convert the summed output currents to second stage output voltage to be inputted to third stage amplifier 144. Third stage amplifier 144 is formed by NPN bipolar transistors Q21 and Q22 having common emitter and biased by a bias current I10. The output loading network of resistors R3 and R4 converts the output currents of third stage amplifier 144 to a differential output voltage Vout on output nodes 146, 148.

Each of signal paths 105a, 105b and 105c incorporates a unique network Net 1, Net 2 and Net 3 to implement a desired frequency dependent response. Each of the networks is connected between the emitter terminals of the input differential pair of the first stage amplifier. In signal path 105a, a network Net 1 is connected between the emitter terminals of transistors Q1 and Q2. Network Net 1 includes a single resistor R1. Network Net 1 implements a linear transform. That is, the first stage differential output currents are linearly related to the input signal Vin. In signal path 105c, a network Net 3 is connected between the emitter terminals of transistors Q15 and Q16. Network Net 3 includes a single capacitor C3. Network Net 3 implements a first derivative of the input signal Vin. That is, the first stage differential output currents are related to the first time derivative of the input signal Vin where the first time derivative has greater magnitude for higher harmonics of the input signal. In signal path 105b, a network Net 2 is connected between the emitter terminals of transistors Q1 and Q2. Network Net 2 includes a resistor R2 and a capacitor C2 connected in series. Network Net 2 implements a frequency band response. That is, the first stage differential output currents are responsive to frequency components within the input voltage signal Vin that are above the pole frequency determined by resistor R2 and capacitor C2 and below the signal path cutoff frequency as determined by other factors.

In operation, the equalization characteristics of transmission line equalizer 100 is programmed to match specific line loss characteristics of the specific transmission medium and line length by adjusting the tail current of the second stage amplifiers 116, thereby adjusting the gain of each signal path. More specifically, the DC bias currents I3, I6 and I9 of the second stage amplifiers in each signal path are individually programmed to adjust the gain of each signal path so as to provide the desired mix of path signals to be summed by the third stage amplifier. In the present embodiment, programming of the DC bias currents I3, I6 and I9 is achieved through supplying individual programmed values to individual gain control nodes Gain_A (node 121), Gain_B (node 122), and Gain_C (node 123) associated with each DC bias current. Only one parameter is required to program the bias current for each signal path. The programming of the DC bias current can be achieved using programming techniques presently known or to be developed. In one embodiment, the programming of the bias current is through a set of resistors, one for each signal path to be programmed. These resistors directly or indirectly determine the level of the tail currents (I3, I6 and I9). These resistors are typically off-chip (i.e. not on the same integrated circuit as the transmission line equalizer). In other embodiments, the programming of the bias currents I3, I6 and I9 is accomplished through on-chip resistors, off-chip resistors or current sources, or a combination of these elements. On-chip resistors can be used to set a fixed gain value for a non-programmable signal path. Programmable bias currents may also be determined via on-chip digital-to-analog converters wherein the digital programming data is loaded to the equalizer chip and retained in some form of volatile or non-volatile storage elements. Other programming means include (but are not limited to) registers, reprogrammable cells such as flash or EPROM, and non-reprogrammable cells, such as fuses, anti-fuses, "zapped" Zener diodes, any of which may be programmed via well-known techniques.

Third Embodiment

Figure 3:
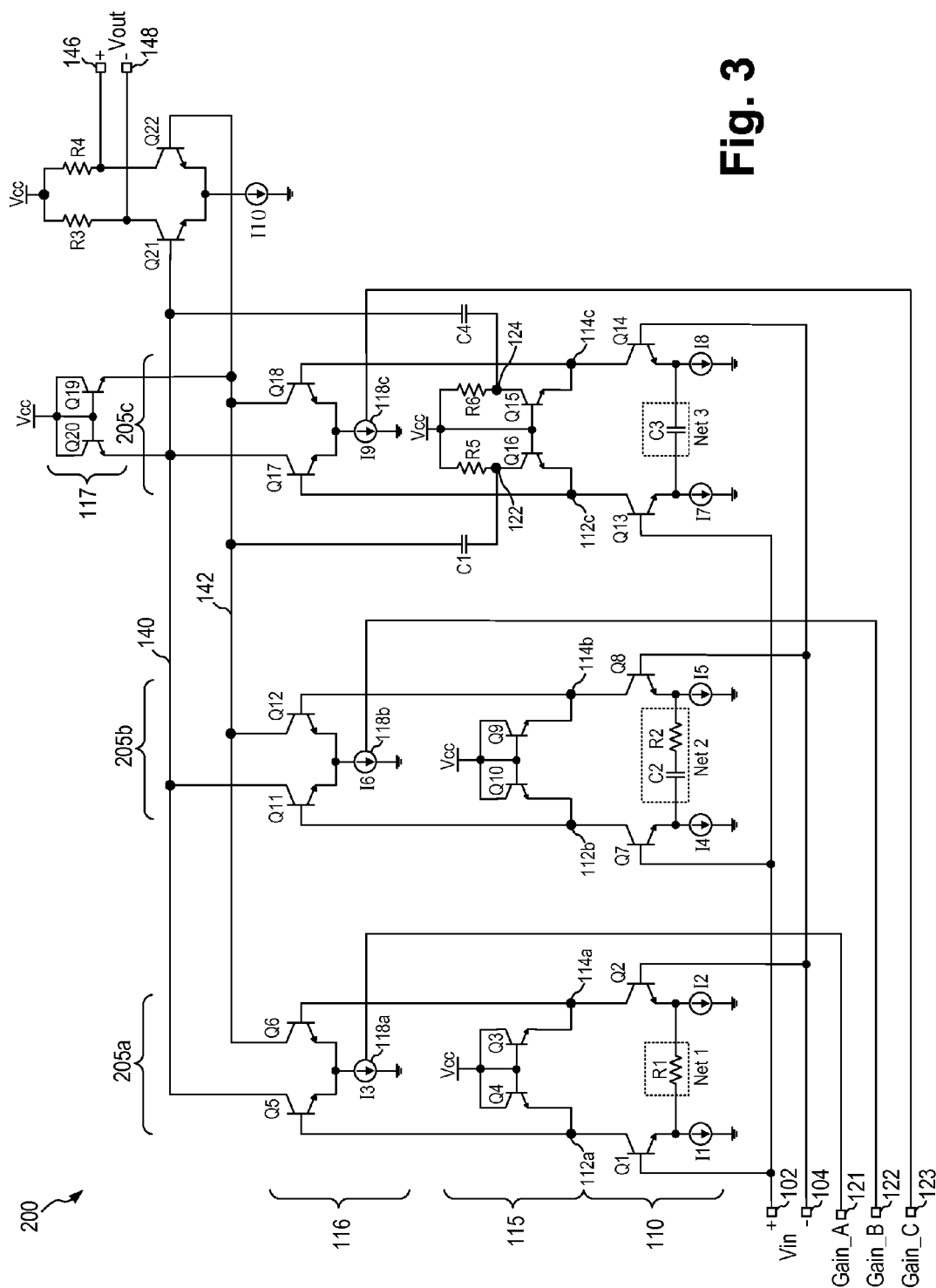
FIG. 3 is a transistor level circuit diagram of a transmission line equalizer according to a third embodiment of the present invention.

FIG. 3 is a transistor level circuit diagram of a transmission line equalizer according to a third embodiment of the present invention. The transmission line equalizer of FIG. 3 is constructed substantially similar to the transmission line equalizer of FIG. 2 and like elements are given like reference numerals to simplify the discussion. Referring to FIG. 3, the transmission line equalizer 200 includes a first signal path 205a including a network Net 1 (resistor R1) implementing a linear transform, a second signal path 205b including a network Net 2 (capacitor C2 and resistor R2) implementing a frequency band response and a third signal path 205c including a network Net 3 (capacitor C3) implementing a first derivative of the input signal. However, the construction of the third signal path 205c has been enhanced as to generate a higher order second derivative of the input signal Vin to extend the equalization to higher harmonic frequency losses and summing the higher order derivative signals with the output currents of the other signal paths.

More specifically, the first stage amplifier (transistors Q13, Q14) of signal path 205c generates differential output currents indicative of the first time derivative of the input signal Vin on output nodes 112c and 114c. The differential output currents associated with the first derivative are then coupled to the second stage amplifier (transistors Q17, Q18). The gain of signal path 205c, that is, the amount of contribution from the first derivative signal, is controlled by bias current I9 via programmable pin Gain_C. So far, the operation of signal path 205c is identical to signal path 105c of equalizer 100 of FIG. 2.

However, in the present embodiment, small resistor loads R5 and R6 are added to the collector terminals of transistors Q16 and Q15, respectively. Furthermore, capacitors C1 and C4 are added between the collector terminals of transistors Q16 and Q15, respectively, and the current summing nodes 142, 140, respectively. The additional capacitors C1 and C4 introduce differential output currents to the current summing nodes that are proportional to the time derivative of the first stage output currents of the signal path. Thus, since the first stage amplifier incorporates capacitor C3 as the network, the first stage differential output currents (nodes 112c, 114c) are proportional to the first derivative of the input signal. Then, the currents coupled through capacitors C1 and C4 become proportional to the second derivative of the input signal Vin. In this manner, the current summing nodes 140, 142 receive a contribution of differential output currents from the second derivative of the input signal Vin, which is indicative of even higher order harmonics of the input signal.

Signal path 205c provides the first derivative and the second derivative of the input signal Vin to the current summing nodes. The second derivative is added to signal path 205c without consuming additional power. However, as shown in FIG. 3, only the first derivative differential output currents are programmable, and the gain of the second derivative differential output currents are not adjustable. This apparent limitation can be overcome by adjusting tail currents I3, I6 and I9 to be in proper ratio to the fixed second derivative path signal magnitude. If desired, magnitude of the Vout signal can subsequently be scaled by adjustably programming tail current I10 or other similar means, a feature not illustrated in FIG. 3. Adjustability of the second derivative differential output currents can also be realized as illustrated in FIG. 4 below.

Fourth Embodiment

Figure 4:
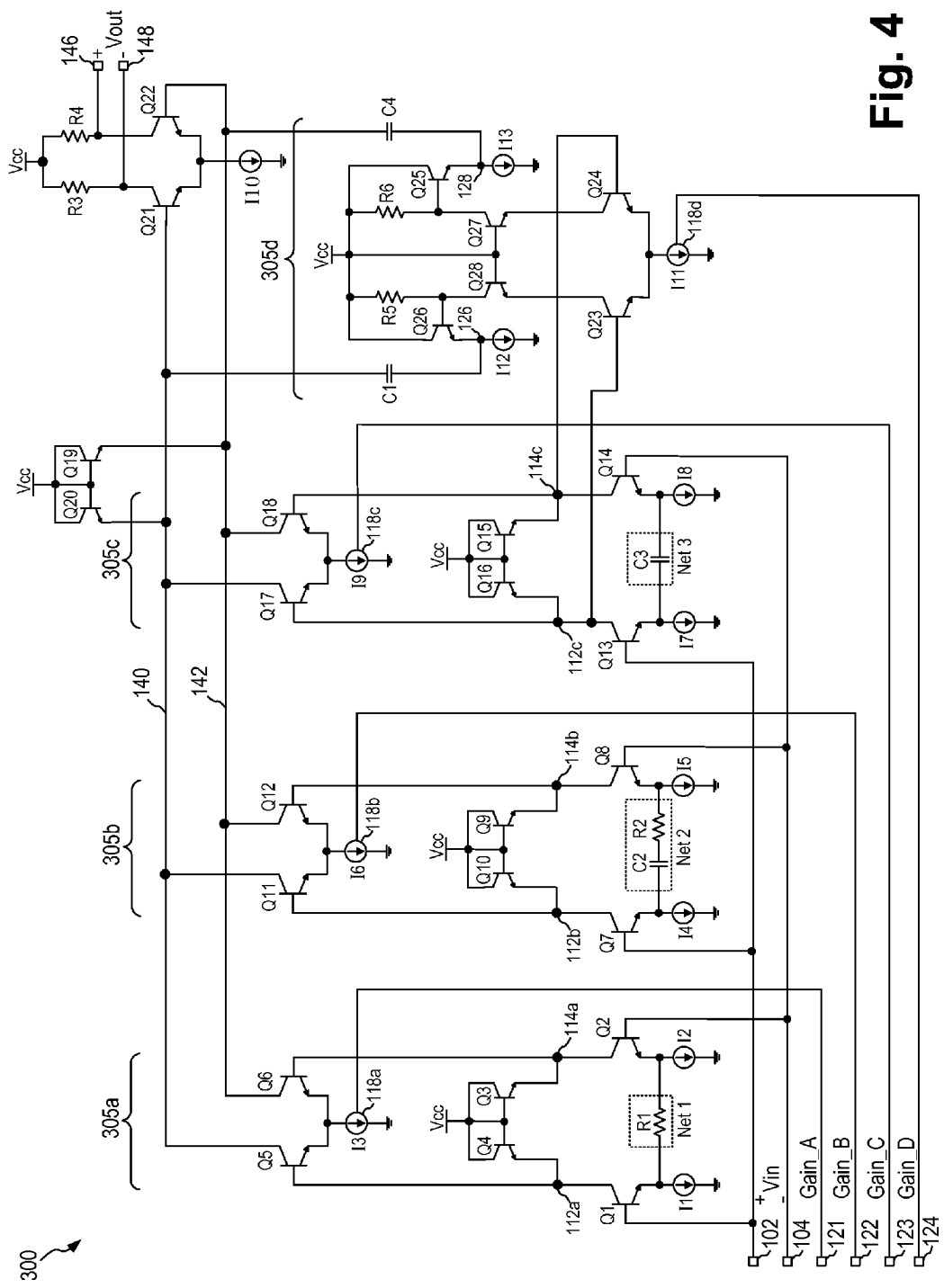
FIG. 4 is a transistor level circuit diagram of a transmission line equalizer according to a fourth embodiment of the present invention.

FIG. 4 is a transistor level circuit diagram of a transmission line equalizer according to a fourth embodiment of the present invention. The transmission line equalizer of FIG. 4 is constructed substantially similar to the transmission line equalizer of FIG. 3 and like elements are given like reference numerals to simplify the discussion. Referring to FIG. 4, the transmission line equalizer 300 includes a first signal path 305a including a network Net 1 (resistor R1) implementing a linear transform, a second signal path 305b including a network Net 2 (capacitor C2 and resistor R2) implementing a frequency band response and a third signal path 305c including a network Net 3 (capacitor C3) implementing a first derivative of the input signal. Equalizer 300 further includes a fourth signal path 305d implementing a second derivative of the input signal while providing programmability of the second derivative differential output currents.

More specifically, in the fourth signal path 305d, the first derivative differential output currents flowing into nodes 112c, 114c drive the nonlinear loads formed by Q15 and Q16, resulting in a differential voltage signal that drives the differential pair formed by transistors Q23 and Q24. As described previously, nonlinear I-V characteristics of the loads and the differential pair effectively cancel, such that the differential collector current signal at transistors Q23, Q24 is linearly related to the differential collector current signal from transistors Q13, Q14. The input differential pair is biased by a current source 118d providing a programmable bias current I11. Current source 118d is controlled by a programmable level applied at Gain_D (node 124) which operates in the same manner as described above to modify the amount of bias current provided to drive the differential pair of Q23 and Q24. The differential output currents of transistors Q23 and Q24 are thus seen to be a scaled replica of the differential current emanating from transistors Q13 and Q14. In this embodiment, the differential output currents from transistors Q23 and Q24 drive common base stages formed by transistors Q27 and Q28. Resistors R5 and R6 provide loading to transistors Q27, Q28, converting the differential current signal from transistors Q23, Q24 into a differential voltage signal, which subsequently drives the emitter follower buffering stages formed by transistor Q26, current source I12, transistor Q25 and current source I13.

The inclusions of the common base stages (transistors Q27, Q28) and/or the emitter follower stages (transistors Q25, Q26) are optional, but are included here for illustrative purposes. Such stages are often employed to preserve bandwidth, but other techniques such as increased bias currents may suffice in some applications. In all cases described or implied here, scalable differential output voltages from signal path 305d is generated. In the present embodiment, the scalable differential output voltages appear across the emitters of transistors Q25 and Q26 that drives capacitors C1 and C4. Capacitor C1 is connected between the emitter terminal (node 126) of transistor Q26 and the current summing node 140. Capacitor C4 is connected between the emitter terminal (node 128) of transistor Q25 and the current summing node 142. As thus configured, the gain of signal path 305d is programmable by bias current I11 and programmable differential output currents related to the second derivative of the input signal flow through capacitors C1 and C4 and are thus introduced to the equalizer to realize further enhancement to the equalization of higher frequency harmonics.

Fifth Embodiment

Figure 5:
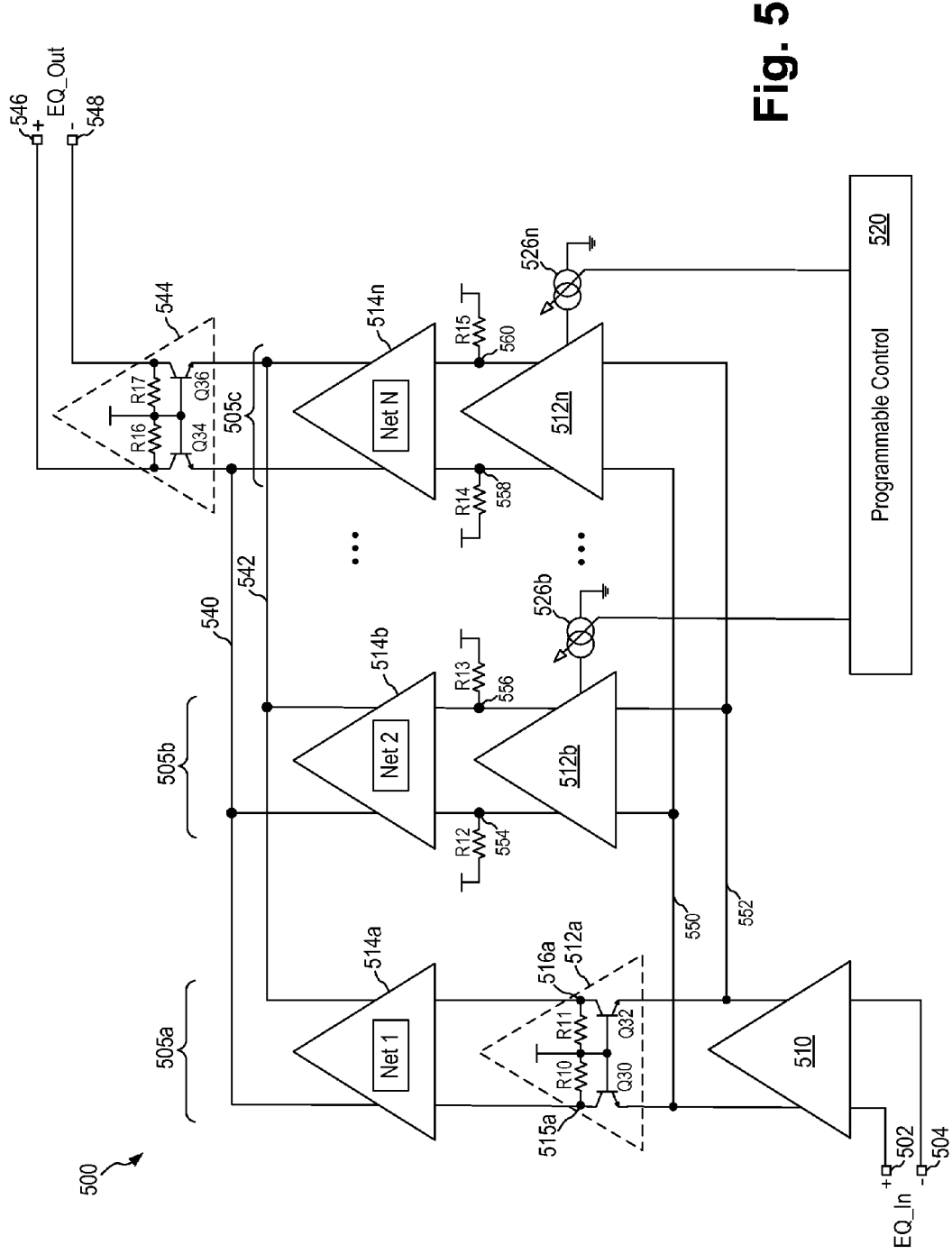
FIG. 5 is a schematic diagram of a transmission line equalizer according to a fifth embodiment of the present invention.

In the above described embodiments, the transmission line equalizer is constructed with the wave shaping stages (first stage amplifiers incorporating the networks) preceding the variable gain stages (second stage amplifiers). In other embodiments of the transmission line equalizer of the present invention, the transmission line equalizer can be configured with the variable gain stages preceding the wave shaping stages to realize certain advantages. FIG. 5 is a generalized schematic diagram of a transmission line equalizer according to a fifth embodiment of the present invention. The transmission line equalizer of FIG. 5 has the particular advantage of superior tolerance to mismatched component characteristics, resulting in less undesirable DC offset within and at the output of the equalizer, as will be explained in more detail below.

Referring to FIG. 5, transmission line equalizer 500 includes an input amplifier 510 receiving the equalizer input signal EQ_In on input nodes 502, 504. The input amplifier 510, also referred to as a "pre-amplifier," is implemented as a linear transconductance amplifier which operates to convert the equalizer input signal voltage into differential output currents applied to nodes 550, 552.

In the present embodiment, the first signal path 505a includes a first stage amplifier 512a implemented as a transimpedance amplifier and a second stage amplifier 514a implemented as a transconductance amplifier. The remaining signal paths 505b-505n each include a first stage amplifier 512b-n implemented as a transconductance amplifier followed by second stage amplifiers 514b-n also implemented as a transconductance amplifiers. Load resistors R12-R15 are coupled to the output terminals of the first stage transconductance amplifiers 512b-n as linear load elements to convert the first stage output currents into voltage signals required to drive the second stage amplifiers. Load resistors R12-R15 can be coupled to the power supply voltage or other appropriate DC voltage. The differential output currents from the second stage amplifiers of all of the signal paths are coupled to current summing nodes 540, 542 to be summed. The summed differential currents are provided to an output amplifier 544 which is implemented as a transimpedance amplifier. Transimpedance amplifier 544 generates a pair of differential output voltages being the equalized output voltage on nodes 546, 548. In FIG. 5, the transimpedance amplifiers 512a and 544 are drawn with dotted line to differentiate the transimpedance amplifiers from the remaining amplifiers which are transconductance amplifiers.

More specifically, first signal path 505a incorporates a transimpedance amplifier as the first stage amplifier 512a formed as twin common base amplifiers formed by transistors Q30, Q32. The differential output currents and DC bias currents from input amplifier 510 flow primarily into the low impedance inputs of transimpedance amplifier 512a, namely the emitters of transistors Q30 and Q32. Transimpedance amplifier 512a sinks virtually all of the output current from input amplifier 510, as the input terminals of amplifier 512a are the only low impedance paths connected to nodes 550 and 552. These currents flow through transistors Q30 and Q32 and generate differential output voltages on output nodes 515a and 516a. As input impedance of the transimpedance amplifier 512a is low, and the voltage swing on the amplifier input nodes is small, high bandwidth or broadband response on these high fan-out nodes is preserved.

In transmission line equalizer 500, transistors Q30 and Q32 serve two purposes. First, transistors Q30 and Q32, with resistors R10 and R11, form common base amplifiers that convert the differential input currents into differential output voltages that drive the second stage amplifier 514a. Second, transistors Q30 and Q32 also act as nonlinear loads, creating small nonlinear differential voltages on nodes 550 and 552 that drive the high impedance inputs of transconductance amplifiers 512b-n. In the present embodiment, transconductance amplifiers 512b-n are implemented as bipolar differential amplifiers. Thus, the transfer characteristics of transconductance amplifiers 512b-n exhibit the inverse nonlinear relationship to the nonlinear loading of transistors Q30 and Q32, such that the differential output currents of 512b-n have a linear relationship to the input signal EQ_In. That is, the nonlinear input I-V characteristics of the transimpedance amplifier 512a precisely compensate for the nonlinear I-V characteristics of the transconductance amplifiers 512b-n. As a result, the differential signal voltages driving the subsequent transconductance amplifiers (the wave shaping stages) in all of the signal paths respond linearly to the equalizer input voltage signal.

In the present embodiment, the first signal path 505a is a fixed gain DC signal path, that is a signal path that implements a broadband response. That is, signal path 505a does not include programmable gain adjustment and network Net 1 in the signal path is implemented as a single resistor to provide a linear transform. The remaining signal paths 505b-n are implemented using variable gain transconductance amplifiers as the first stage amplifiers and are variable gain signal paths.

The second stage amplifiers (514b-n) of paths 505b-n incorporate networks implementing frequency dependent responses other than the linear transform.

In transmission line equalizer 500, first stage amplifiers 512b-n are implemented as variable gain transconductance amplifiers where programmable current sources 526b-n provide the bias currents driving the amplifiers. Programming of the DC bias current for amplifiers 512b-n can be realized using various programming techniques as described above. Current sources 526b to 526n are controlled by a programmable control block 520 to set the desired magnitude of the bias current applied to each signal path 505b-n, thereby adjusting the gain for each signal path. As in the previously discussed embodiments, programming of the DC bias current for amplifiers 512b-n is realized using time invariant, DC programming signals.

A salient feature of transmission line equalizer 500 is its relative insensitivity to transistor emitter-base voltage mismatches. In the present embodiment, the first signal path 505a, containing Net 1 implementing a linear transform, carries all of the equalizer input signal's DC information. Currents from the input transconductance amplifier 510 pass through transimpedance amplifier 512a fundamentally unaffected by emitter-base voltage (Vbe) mismatch (e.g., between transistors Q30 and Q32) within this amplifier. All other signal paths do not respond to changes in the DC levels in the input signal as their built-in networks include series connected capacitors that block DC. So the output currents of signal paths 505b-n are insensitive to Vbe voltage mismatch. Eliminating the equalizer output DC offset is important as this reduces possible output signal duty cycle distortion and eliminates data pattern balance restrictions, thus expanding the range of application for devices incorporating this technique.

Similar to the wave shaping stages 10a-n of FIG. 1, amplifiers 514b-n provide wave shaping within equalizer 500. Unlike equalizer 1 in FIG. 1, scaling of each path signal is accomplished before instead of after wave shaping by varying the gain of amplifiers 512b-n relative to the fixed gain stage 512a. Differential current output signals from each path are summed in this embodiment on nodes 540 and 542. Output amplifier 544 is a simple transimpedance amplifier constructed with twin common base amplifiers in the same manner as transimpedance amplifier 512a. Amplifier 544 generates a linear output voltage across resistors R16 and R17 as the equalized output voltage EQ_Out. Other configurations of output amplifier could be employed. But, as discussed regarding amplifier 512a, the transimpedance configuration used in the present embodiment has particular advantage in that the transimpedance amplifier simply passes signal currents through, thus avoiding possible Vbe mismatch and attendant DC offset problems.

In the present embodiment, transmission line equalizer 500 includes a single pre-amplifier 510 providing output currents that drive the non-linear input circuit of the first stage amplifier 512a of the first signal path 505a. The non-linear input circuit of the first stage amplifier 512a of the first signal path 505a creates small nonlinear differential voltages on nodes 550 and 552 that drive the high impedance inputs of transconductance amplifiers 512b-n. This configuration is illustrative only. In other embodiments, a separate pre-amplifier and a separate non-linear load network can be used to generate the voltages for driving the first stage amplifier 512b-n. It is not critical that voltages on nodes 550 and 552 be generated by a single preamplifier coupled to a single non-linear low input impedance amplifier.

In the above described embodiments, the transmission line equalizer of the present invention is described as being constructed using bipolar transistors. In other embodiments, the transmission line equalizer of the present invention can be constructed using other semiconductor technologies, such as using MOS, CMOS, JFET and MESFET device technologies.

Furthermore, in the above described embodiments, the transmission line equalizer of the present invention incorporates transconductance amplifiers having fixed or variable gain based on the Gilbert gain cell in each of the signal paths to implement the first stage amplifier, the second stage amplifier, the pre-amplifier in FIG. 5 or the output amplifier in FIG. 1. The amplifiers circuits described above are illustrated and are not intended to be limiting. In other embodiments, other implementations of the Gilbert gain cells can be used to implement the amplifier stages of the transmission line equalizer. For instance, interstage loading network 17 with transconductance amplifier 44 of FIG. 1 performs the same function as transimpedance amplifier 544 of FIG. 5 and the two output amplifier configurations can be applied in any of the embodiments of the transmission line equalizer of the present invention.

Also, in some of the above-described embodiments, one of the signal paths in the transmission line equalizer has a single fixed gain. In other embodiments, the signal paths of the transmission line equalizer can be configured to include one or more fixed gain signal path together with one or more variable gain signal paths. Moreover, in the above-described embodiments, the variable gain amplifiers in the multiple signal paths are biased by individual DC programming signals. In other embodiments, the variable gain amplifiers in two or more signal paths may share a common DC programming signal. The fixed gain versus variable gain amplification and the programmability of the variable gain amplifiers are traded off for flexibility, simplified circuitry and programming requirements.

Furthermore, in the above-described embodiments, the transmission line equalizer is constructed using signal paths configured with the wave shaping stages preceding the fixed/variable gain stages (FIG. 1) or using signal paths configured with the fixed/variable gain stages preceding the wave shaping stages. The configurations and arrangements of the signal paths and the wave shaping or gain stages in the above-described embodiments are illustrative only. In other embodiments, the signal paths of the transmission line equalizer can be configured using a combination of signal paths, with one or more signal paths having the wave shaping stages preceding the gain stages and one or more other signal paths having the gain stages preceding the wave shaping stages. Any combination of signal paths with "wave shaping first, gain stages last" or "gain stages first, wave shaping stages last" may be used to form the transmission line equalizer of the present invention.

Different embodiments of the transmission line equalizer of the present invention include one or more of the following features. First, the transmission line equalizer of the present invention includes multiple parallel signal paths driven by a common source of the equalizer input signal and the output currents of the parallel signal paths are summed into a single equalized or restored output signal. Second, the frequency dependent response of each signal path is determined by a unique on-chip network. The on-chip networks are implemented using simple circuitry. Third, in some embodiments, at least one signal path carries DC input information, thereby eliminating data pattern or start-up conditions. Fourth, one or more of the signal paths contain variable gain transconductance amplifiers, enabling equalization of a broad class of equalization tasks via adjustment of the gains in the signal paths relative to each other. Fifth, in some embodiments, pairs of compensating nonlinear loading networks and amplifier transfer characteristics maintain high bandwidth of operation at low power. Sixth, preferred sequences of wave shaping and variable gain stages, plus amplifier stage configurations relating to DC and AC coupled signal paths may be chosen to minimize DC offset issues. Seventh, variable gain values are determined via DC or other time invariant programming means, so the only high speed signals that must be ported off chip are the equalizer input and output signals. Lastly, the equalizer circuit can be constructed in several semiconductor technologies including bipolar, BiCMOS, CMOS, MOS, and MESFET.

The above detailed descriptions are provided to illustrate specific embodiments of the present invention and are not intended to be limiting. Numerous modifications and variations within the scope of the present invention are possible. The present invention is defined by the appended claims.

We claim:

1. A transmission line equalizer, comprising:
    a plurality of signal paths connected in parallel between an equalizer input signal and an output amplifier, each signal path having a network implementing a specific frequency dependent response, each signal path implementing current gain amplification with one or more of the signal paths having a variable gain programmed through a time invariant, DC programming signal, and one or more of the signal paths implementing linear-to-nonlinear signal transformations and compensating nonlinear-to-linear signal transformations to generate linearized output signals at the one or more signal paths; and
    the output amplifier configured to sum the output signals from the plurality of signal paths and to generate an equalized output signal,
    wherein the gain of the one or more signal paths is varied to establish the relative proportions of the output signals generated by each signal path and summed at the output amplifier.

2. The transmission line equalizer of claim 1, wherein the transmission line equalizer is formed on an integrated circuit and the network implementing a specific frequency dependent response for each of the signal path is formed on the same integrated circuit.

3. The transmission line equalizer of claim 1, wherein the plurality of signal paths comprises one or more of the signal paths having a variable gain and one or more signal paths having a fixed gain.

4. The transmission line equalizer of claim 1, wherein one or more of the signal paths comprises an amplifier providing current gain amplification through signal multiplication, the current gain amplification having a fixed gain value or a variable gain value, wherein an input signal to the amplifier is multiplied by the fixed or variable gain value to generate an amplifier output signal.

5. The transmission line equalizer of claim 1, wherein the plurality of signal path and the output amplifier are constructed using one or a combination of bipolar, BiCMOS, CMOS, MOS, JFET and MESFET fabrication technologies.

6. The transmission line equalizer of claim 1, wherein the plurality of signal paths comprises one or more signal paths each including a first stage amplifier incorporating a network implementing the specific frequency dependent response followed by a second stage amplifier providing a variable gain or a fixed gain.

7. The transmission line equalizer of claim 1, wherein the plurality of signal paths comprises one or more signal paths each including a first stage amplifier providing a variable gain or a fixed gain followed by a second stage amplifier incorporating a network implementing the specific frequency dependent response.

8. The transmission line equalizer of claim 1, wherein the plurality of signal paths each realizes a unique frequency dependent response selected from one of a broadband response, a frequency band response where a given frequency range is amplified more than other frequency range, and a time derivative response where the current gain amplification increases with a frequency of the equalizer input signal.

9. The transmission line equalizer of claim 8, wherein the frequency band response has a frequency range having a lower frequency limit determined by the network.

10. The transmission line equalizer of claim 8, wherein the time derivative response comprises a first time derivative response and/or a second time derivative response.

11. The transmission line equalizer of claim 8, wherein a first signal path implementing a broadband response as the frequency dependent response incorporates a network comprising a resistor.

12. The transmission line equalizer of claim 8, wherein a first signal path implementing a frequency band transformation as the frequency dependent response incorporates a network comprising a serial connection of a resistor and a capacitor, a pole frequency of the resistor and the capacitor setting a lower frequency limit of the frequency range of the frequency band response.

13. The transmission line equalizer of claim 8, wherein a first signal path implementing a first derivative of the equalizer input signal as the frequency dependent response incorporates a network comprising a capacitor.

14. The transmission line equalizer of claim 8, wherein the plurality of signal paths comprise a first signal path implementing a broadband response and the remaining signal path or paths implementing one or more of the frequency band responses or the time derivative responses, wherein the frequency dependent responses overlap and cumulate for higher frequencies so that the equalizer output signal generated by the output amplifier has a magnitude that increases with increasing frequency.

15. The transmission line equalizer of claim 1, wherein each signal path comprises:
    a first stage amplifier incorporating a network implementing the specific frequency dependent response, the first stage amplifier having differential input terminals receiving the equalizer input signal and generating first stage differential output currents on differential output nodes, the differential output currents indicative of the equalizer input signal being applied to the frequency dependent response implemented by the network;
    a first interstage loading network having a first nonlinear current-voltage characteristic connected to the differential output nodes, the first interstage loading network transforming the first stage differential output currents into first stage differential output voltages at the differential output nodes; and
    a second stage amplifier having differential input terminals receiving the first interstage load differential output voltage, the second stage amplifier having an input circuit with a second nonlinear current-voltage input-to-output transfer characteristic being an inverse of the first nonlinear current-voltage characteristic, the second stage amplifier generating a second stage differential output currents being linearly proportional to the equalizer input voltage, the second stage differential output currents being coupled to differential current summing nodes, wherein in the one or more of the signal paths having a variable gain, the second stage amplifier comprises a variable gain amplifier, the gain of the variable gain amplifier being set by the time invariant, DC programming signal.

16. The transmission line equalizer of claim 15, wherein the equalizer input signal and the equalizer output signal comprise differential signals.

17. The transmission line equalizer of claim 15, wherein the equalizer input signal and the equalizer output signal comprise single-ended signals, the single-ended signal being applied to one of differential input terminals of the first stage amplifier with the other input terminal being connected to an AC ground.

18. The transmission line equalizer of claim 15, wherein the first stage amplifier in each path comprises a transconductance amplifier.

19. The transmission line equalizer of claim 15, further comprising a second interstage loading network having a third nonlinear current-voltage characteristic coupled to the differential current summing nodes, wherein the output amplifier comprises a transconductance amplifier and an output loading stage generating the equalized output signal, the output amplifier having an input circuit with a fourth nonlinear current-voltage characteristic being inverse of the third nonlinear current-voltage characteristic.

20. The transmission line equalizer of claim 19, wherein the output amplifier comprises bipolar transistor differential transconductance amplifiers and the second interstage loading network comprises a pair of diodes having first current handling terminals connected to a second DC voltage and second current handling terminals connected to a respective one of the differential current summing nodes.

21. The transmission line equalizer of claim 15, wherein the second stage amplifier in each path comprises a transconductance amplifier and in each of the one or more signal paths having a variable gain, the second stage amplifier comprises a variable gain transconductance amplifier, the gain of the variable gain transconductance amplifier being set by the time invariant, DC programming signal.

22. The transmission line equalizer of claim 21, wherein the time invariant, DC programming signal varies a DC bias current supplied to the variable gain transconductance amplifier.

23. The transmission line equalizer of claim 21, wherein the second stage amplifier comprises bipolar transistor differential transconductance amplifiers and the first interstage loading network comprises a pair of diodes having first current handling terminals connected to a first DC voltage and second current handling terminals connected to a respective one of the differential output nodes of the first stage amplifier.

24. The transmission line equalizer of claim 1, further comprising a first input pre-amplifier having differential input terminals receiving the equalizer input voltage signal, the first input pre-amplifier providing differential output currents to drive a first stage amplifier in at least a first signal path in the plurality of signal paths, wherein the first signal path has a first stage amplifier with low input impedance and incorporating a network to implement a broadband response and remaining signal paths have first stage amplifiers with high input impedance and incorporating networks to implement a frequency dependent response other than the broadband response.

25. The transmission line equalizer of claim 24, wherein the first signal path of the plurality of signal paths comprises:

a first stage amplifier being a low input impedance amplifier, the first stage amplifier having differential input terminals receiving substantially all of the differential output currents from the first input pre-amplifier and the first stage amplifier passing the differential output currents to first stage differential output nodes without adding offset currents, the first stage amplifier having an input circuit with a first nonlinear current-voltage characteristic, the first stage amplifier having a fixed gain; and a second stage amplifier incorporating a network implementing the broadband frequency response, the second stage amplifier having differential input terminals coupled to the first stage differential output nodes of the first stage amplifier, the second stage amplifier generating second stage differential output currents on differential current summing nodes indicative of the equalizer input signal being applied to the broadband frequency response implemented by the network, wherein the first stage amplifier of the first signal path generates differential output voltages at input terminals of the input circuit thereof as a result of receiving substantially all of the differential output currents from the first input pre-amplifier, the differential output voltages having the first nonlinear current-voltage characteristic.

26. The transmission line equalizer of claim 25, wherein the first stage amplifier of the first signal path is implemented as a low input impedance transimpedance amplifier and having a fixed gain and the second stage amplifier of the first signal path is implemented as a transconductance amplifier.

27. The transmission line equalizer of claim 25, wherein the plurality of signal paths other than the first signal path each comprises:

a first stage amplifier having a pair of differential input terminals and an input circuit with a second nonlinear current-voltage input-to-output transfer characteristics, the input terminals being driven by differential output voltages having a nonlinear current-voltage characteristics being an inverse of the second nonlinear current-voltage input-to-output transfer characteristics, the first stage amplifier generating first stage differential output currents at first stage differential output nodes being linearly proportional to the equalizer input voltage;

an interstage loading network coupled to convert the first stage differential output currents at the first stage differential output nodes into first stage differential output voltages;

a second stage amplifier incorporating a network implementing the specific frequency response other than the broadband response, the second stage amplifier having a pair of differential input terminals receiving the first stage differential output voltages and generating a second stage differential output currents being coupled to the differential current summing nodes, the second stage differential output currents indicative of the equalizer input signal being applied to the frequency response implemented by the network, wherein in each of the one or more signal paths having a variable gain, the first stage amplifier comprises a variable gain amplifier, the gain of the variable gain amplifier being set by the time invariant, DC programming signal.

28. The transmission line equalizer of claim 27, wherein in the plurality of signal paths other than the first signal path, the first stage amplifiers comprise transconductance amplifiers coupled to linear load elements and the second stage amplifiers comprise transconductance amplifiers.

29. The transmission line equalizer of claim 27, wherein in the plurality of signal paths other than the first signal path, the variable gain amplifiers of the first stage amplifiers in the one or more signal paths having a variable gain comprise variable gain transconductance amplifiers.

30. The transmission line equalizer of claim 27, wherein the differential input terminals of the first stage amplifier of the plurality of signal paths other than the first signal path are driven by differential output voltages generated by the input circuit of the first stage amplifier of the first signal path, the second nonlinear current-voltage input-to-output transfer characteristics being an inverse of the first nonlinear current-voltage characteristics.

31. The transmission line equalizer of claim 27, wherein the differential input terminals of the first stage amplifier of the plurality of signal paths other than the first signal path are driven by differential output voltages generated by one or more input pre-amplifiers other than the first input pre-amplifier and corresponding one or more nonlinear loading circuit having the first nonlinear current-voltage characteristics, the one or more input pre-amplifiers receiving the equalizer input voltage signal and generating differential output currents to drive the respective nonlinear loading circuit, thereby generating the differential output voltages having the first nonlinear current-voltage characteristics to drive the first stage amplifier of the plurality of signal paths.

32. The transmission line equalizer of claim 27, wherein the output amplifier comprises a transimpedance amplifier coupled to receive the second stage differential output currents summed on the differential current summing nodes.

* * * * *